United States Patent
Rogg

(10) Patent No.: US 11,156,211 B2
(45) Date of Patent: Oct. 26, 2021

(54) ROTOR LOCKING SYSTEM

(71) Applicant: Adwen GmbH, Bremerhaven (DE)

(72) Inventor: Andreas Rogg, Hamburg (DE)

(73) Assignee: ADWEN GMBH

( * ) Notice: Subject to any disclaimer, the term of this patent is extended or adjusted under 35 U.S.C. 154(b) by 57 days.

(21) Appl. No.: 16/500,047

(22) PCT Filed: Apr. 6, 2018

(86) PCT No.: PCT/EP2018/058877
§ 371 (c)(1),
(2) Date: Oct. 1, 2019

(87) PCT Pub. No.: WO2018/185296
PCT Pub. Date: Oct. 11, 2018

(65) Prior Publication Data
US 2020/0182227 A1 Jun. 11, 2020

(30) Foreign Application Priority Data

Apr. 7, 2017 (EP) ..................................... 17165561

(51) Int. Cl.
*F03D 80/50* (2016.01)
*F03D 17/00* (2016.01)
(52) U.S. Cl.
CPC ............. *F03D 80/50* (2016.05); *F03D 17/00* (2016.05); *F05B 2260/31* (2020.08)
(58) Field of Classification Search
None
See application file for complete search history.

(56) References Cited

U.S. PATENT DOCUMENTS 7,397,145 B2 * 7/2008 Struve ................... F03D 7/0244
290/55
8,869,521 B2 * 10/2014 Stephenson ............. F04B 49/22
60/468

(Continued)

FOREIGN PATENT DOCUMENTS

| CN | 201496211 U | 6/2010 |
| CN | 102330644 A | 1/2012 |
| CN | 103644082 A * | 3/2014 |

(Continued)

OTHER PUBLICATIONS

Non-English Chinese Office Action for Application No. 201880022312.9, dated May 28, 2020.

(Continued)

*Primary Examiner* — Juan G Flores
(74) *Attorney, Agent, or Firm* — Schmeiser, Olsen & Watts LLP

(57) ABSTRACT

Provided is a rotor locking system for a rotor hub of a wind driven power plant, including a rotor locking disk, a rotor locking pin unit, and a rotor locking pin, wherein the rotor locking disk is mounted to the rotor hub, wherein the rotor locking pin is an actuated element of the rotor locking pin unit, wherein the rotor locking pin is configured to assume a first position The rotor locking pin is configured to assume a second position in which the rotor locking pin extends into a recess of the rotor locking disk such that a rotation of the rotor hub is preventable, and wherein the rotor locking pin is lockable.

16 Claims, 6 Drawing Sheets

(56) References Cited

U.S. PATENT DOCUMENTS

2010/0194114 A1* 8/2010 Pechlivanoglou .... F03D 7/0248
290/55
2013/0323051 A1* 12/2013 Yuge .................... F03D 7/0224
416/1

FOREIGN PATENT DOCUMENTS

| CN | 102226445 B | 2/2015 |
| --- | --- | --- |
| DE | 102008054100 A1 | 5/2010 |
| DE | 102014218804 A1 | 3/2016 |
| EP | 2905467 A1 | 12/2015 |
| GB | 2522796 A | 8/2015 |
| KR | 20140072561 A | 6/2014 |

OTHER PUBLICATIONS

PCT International Search Report for International Application No. PCT/EP2018/058877, dated Jul. 3, 2018.
English Translation of Indian Office Action for Application No. 201937036507, dated Jan. 21, 2021.

* cited by examiner

ROTOR LOCKING SYSTEM

CROSS-REFERENCE TO RELATED APPLICATIONS

This application claims priority to PCT Application No. PCT/EP2018/058877, having a filing date of Apr. 6, 2018, which is based off of EP Application No. 17165561.6, having a filing date of Apr. 7, 2017, the entire contents both of which are hereby incorporated by reference.

FIELD OF TECHNOLOGY

The following relates to a rotor locking system for a rotor hub of a wind driven power plant.

BACKGROUND

Wind is one of the most important renewable energy technologies. Wind turbines (also referred to as a wind driven power plants, wind turbine generators, or wind energy converters) are more and more arranged in large-scale offshore wind parks. There are many technical challenges relating to these offshore wind parks, as for example the assembly of parts and the transport, the erection of the wind turbine in the sea and the maintenance of the wind driven power plants.

A conventional rotor locking mechanism comprises a hand operated mechanism for locking the rotor hub. Hand operated systems in general may be mishandled or forgotten which causes hazards of damages or injuries during maintenance work or assembly actions.

SUMMARY

An aspect relates to provide a rotor locking system which reduces the risk of damages or injuries during maintenance work or assembly actions of the rotor. Embodiments of the invention also provides a method for determining a status of the rotor locking system.

According to an aspect, a rotor locking system for a rotor hub of a wind driven power plant can comprise a rotor locking disk, a rotor locking pin unit, and a rotor locking pin. The rotor locking disk can be mounted to the rotor hub or rotor shaft. The rotor locking pin can be configured to be an actuated element of the rotor locking pin unit. The rotor locking pin can be configured to assume a first position. The rotor locking pin can be configured to assume a second position in which the rotor locking pin extends into a recess of the rotor locking disk. A rotation of the rotor hub can be preventable if the rotor locking pin assumes the second position and extends into the recess of the rotor locking disk. The rotor locking pin can be configured to be lockable. By means of the actuary based rotor locking system, the risk of mishandling or forgetting the locking of the rotor hub is advantageously reduced compared systems according to the prior art. By means of the rotor locking system the rotor hub can be fixed in a safe manner advantageously avoiding hazards for equipment or persons during maintenance or assembly operations for which the rotor hub has to be stopped.

According to another aspect, the rotor locking system can comprise a locking sensor. The locking sensor can be configured to determine a locking status of the rotor locking pin. Advantageously, a user of the rotor locking system can identify the status of the locking of the rotor locking pin without a doubt. In particular, the locking sensor may be any device that is configured to detect whether the rotor locking pin is fixed in the position at hand.

According to another aspect, the rotor locking pin can be a hydraulically driven cylinder. The process fluid which is used inside the working volumes can be a hydraulic liquid, e.g. a hydraulic oil. A hydraulic oil enables high pressures to be used inside the working volumes. High pressures advantageously provide higher forces which the actuated element, i.e. the rotor locking pin, can withstand. Further advantageously, hydraulic process fluids are substantially incompressible in comparison to pneumatic process mediums.

According to another aspect, the rotor locking system can further comprise a displacement sensor. The displacement sensor can be configured such that a position of the rotor locking pin is detectable. The displacement sensor can further be configured to output the detected position as a signal. The signal may be an analog or digital signal, in particular an analog signal. By means of the displacement sensor a fully retracted position (first position), fully extended position (second position) or a different position (intermediate position) of the rotor locking pin can advantageously be identified. In this context, a position also refers to a range of positions.

According to another aspect, the rotor locking system can further comprise a working space and a piston. The piston can be configured to define a first working volume inside the working space. The working space, the piston and the working volume can be configured to be part of an interior space of the rotor locking pin. The position of the piston inside the working space can define a position of the rotor locking pin. The working volume can advantageously be configured such that a variation of the working volume causes a movement, i.e. an extension or retraction of the rotor locking pin. This means the rotor locking pin can be configured to advantageously act as an actuated cylinder driven by the size of the working volume. The piston, i.e. the cylinder can also be separated from the rotor lock pin.

According to another aspect, the rotor locking system can further comprise a first pressure sensor. The first pressure sensor can be configured to determine an internal pressure inside the first working volume. The first pressure sensor can allow the pressure of the process fluid inside the working volume to be determined. The first pressure sensor can be directly connected to the reservoir of the working volume. This advantageously allows the working volume to be used in a controlled manner. The first pressure sensor can further be configured to output the detected pressure as a signal. The signal may be an analog or digital signal, in particular, an analog signal.

According to another aspect, the rotor locking system can further comprise a valve for the first working volume inside the working space. The valve can be configured as a load holding valve. The valve can advantageously be configured such that a variation of the process fluid inside the working volume is only possible if a pressure larger than a specified pre-load is initially applied from the pressure supply side. With an initially provided pressure from the supply side being higher than the pre-load of the load holding valve, the load holding valve may open and allow the pressure inside the working volume to be varied. By means of the load holding valve the pressure of the process fluid inside the working volume can advantageously be kept constant irrespective of the pressure inside the working volume and despite a possible failure in the pressure supply line. A pressure relief valve can be included in order to limit the pressure inside the working volume to a predetermined value.

According to another aspect, the rotor locking system can further comprise a second working volume and a counterbalance valve. The piston can be configured to advantageously divide the working space into a first working volume and a second working volume. The counterbalance valve can be connected to the first working volume and the second working volume. The position of the rotor locking pin can be determined based on the relative internal pressures inside the first working volume and the second working volume. The counterbalance valve can be configured to prevent an unintended unlocking of the rotor locking pin. By means of the counterbalance valve the amounts of the process fluids inside both working volumes can advantageously be precisely controlled even if high differences among the pressures in both working volumes exist.

A pressure loss inside the working volumes can potentially cause an unlocking of the rotor locking pin. An unlocking of the rotor locking pin can cause hazards for equipment or persons during maintenance or assembly operations. The counterbalance valve can be configured to prevent an unwanted pressure loss inside the working volume if a pressure loss of a supply unit for the process fluid of the working volumes appears. Advantageously, by this mechanism a variation of the relative pressures inside the internal working volumes of the rotor locking pin can be prevented even if the pressure of the supply unit is lost. Since the relative pressures of the working volumes may be kept constant, a movement of the rotor locking pin can be prevented. In other words, the counterbalance valve can advantageously be configured to hold pressures inside the working volumes. This way, an unintended movement, i.e. an unlocking, of the rotor locking pin is preventable. Due to the counterbalance valve hazards for equipment or persons during maintenance or assembly operations are advantageously avoided.

According to another aspect, the rotor locking system can comprise a second pressure sensor. The second pressure sensor can be configured to determine an internal pressure inside the second working volume. The second pressure sensor can allow the pressure of the process fluid inside the second working volume to be determined. The second pressure sensor can be directly connected to the reservoir of the working volume. This advantageously allows the working volume to be used in a controlled manner. The second pressure sensor can further be configured to output the detected pressure as a signal. The signal may be an analog or digital signal, in particular an analog signal.

According to another aspect, at least one out of the load holding valve and the counterbalance valve and the first pressure sensor and the second pressure sensor can be directly connected to a central pipe and/or a housing part of the rotor locking pin unit. The central pipe and/or the housing part of the rotor locking pin unit can comprise supply lines. The supply lines can be connected to the working volumes and/or can be an integral part of the rotor locking pin unit. The direct connection of the devices to the working volumes ensures that the pressures inside the respective working volumes are directly controlled and/or detectable by the devices at all times. Advantageously, the risks of an unwanted behavior of the rotor locking system can be reduced by the direct connection in comparison to an indirect connection, e.g. if intermediate portions of the process fluid circuit may falsify the status or measurement of the devices.

According to another aspect, the rotor locking system can further comprise an operation control unit. The operation control unit can be configured to receive signals of the displacement sensor and the first pressure sensor. The operation control unit can further be configured to determine a status of the rotor locking system by means of at least one position value detected by the displacement sensor and at least one pressure value detected by the first pressure sensor. The operation control unit can further be configured to output the determined status of the rotor locking system by means of a signaling device and/or a communication device. The signaling device can be configured to indicate the determined status by an acoustic or an optic signal. The communication device and the operation control unit can further be configured to transmit several data or data sets of devices or sensors 37, 38 being connected to the operation control towards an interface that is connected to the communication device. The interface may then indicate the status of the rotor locking system although it is spatially distanced from the rotor locking system.

The operation control unit can further be configured to receive signals of additional sensors such as an additional pressure sensor, a load holding valve, a counterbalance valve a speedometer of the rotor locking disk, a position sensor of the rotor locking disk, etc. The operation control unit can further be configured to include the received signals of additional sensors in the process of determining the status of the rotor locking system.

According to another aspect, the rotor locking pin unit can be mounted to a main frame of the wind turbine. The rotor hub can be supported by a main frame in the interior space of the nacelle. The main frame can be mounted to the tower of the wind driven power plant. By supporting the rotor locking pin unit by means of the main frame of the wind driven power plant, the rotor locking pin unit can be supported in a fixed position. In other words, the rotor locking pin unit can be supported in a fixed position, while the rotor locking disk and the rotor hub in general may rotate. The support of the rotor locking pin unit can be configured such that the rotor locking pin meets a recess circle on which the recess of the rotor locking disk orbits if the rotor locking disk is rotating. By supporting the rotor locking pin unit in a fixed position, the rotor locking pin can prevent the rotor locking disk from circulating, if the rotor locking pin is in the second position, i.e. extends into a recess of the rotor locking disk.

The rotor locking disk can advantageously have a maximum thickness of equal or more than 30 mm. Further advantageously, the rotor locking disk can have a maximum thickness of 100 mm. The rotor locking pin can advantageously have a maximum outer diameter of equal to or more than 100 mm and equal to or less than 500 mm. Further advantageously, the rotor locking pin can have a maximum outer diameter of 280 mm. The rotor locking pin can advantageously have a total length of equal to or more than 200 mm. Further advantageously, the rotor locking pin can have a total length 525 mm.

According to another aspect, the rotor locking system can further comprise a remote control. The rotor locking system can be configured such that the rotor locking pin is remotely controllable with respect to its position. The communication device of the operation control unit can further be configured such that the operation control unit can be accessed by the remote control. The remote control can further be configured such that individual data or data sets of the operation control unit can be transferred towards the remote control. The individual data or data sets can comprise signals of sensors or devices being connected to the operation control unit or data or data sets of a routine being executed in the operation control unit. The remote control can further be configured such that the remote control can read out or manipulate a status of a sensor or device being connected to the operation control unit. The remote control can further be configured such that the remote control can execute operations for the operation control unit and/or devices and/or sensors connected to the operation control unit. The remote control advantageously provides the possibility to control or execute the rotor locking system or parts of it without the need for being present at the rotor locking system. This advantageously simplifies the handling of the rotor locking system during maintenance or assembly operations.

According to another aspect, the rotor locking system can comprise a position sensor. The position sensor can be configured to detect a position of the rotor locking disk. The position sensor can further be configured such that an alignment of a recess of the rotor locking disk with respect to the rotor locking pin is determinable. The position sensor can advantageously detect a configuration in which an extension of the rotor locking pin would cause the rotor locking pin to be extended into a recess of the rotor locking disk. In other words, the position sensor can be configured as a measure when an extension of the rotor locking pin may be carried out in order to lock the rotor locking disk and thereby the rotor hub. The position sensor can be configured to output the detected position of the rotor locking disk as a signal. The signal may be an analog or digital signal, in particular an analog signal.

According to another aspect, the rotor brake can be configured to stop the rotor and hold the drive train in a correct angular position such that the rotor locking pin is insertable. The rotor brake can be configured to prevent the drive train from rotating any further after the correct position for introducing the rotor locking pin is achieved.

According to another aspect, the rotor locking system can comprise a plurality of rotor locking pins. For each rotor locking pin of the plurality of rotor locking pins the design and functionality can be similar to each other. In particular, the rotor locking system can comprise two rotor locking pin units. The rotor locking pin units may be mirror symmetrically supported by the main frame. By means of a plurality of rotor locking pin units the rotor locking system is redundant with respect to the number of rotor locking pins which advantageously reduces the risk of failures of the rotor locking system.

According to an aspect, a method can determine a status of a rotor locking system comprising a rotor locking disk and a rotor locking pin, an operation control unit, a first sensor and a second sensor. The rotor locking pin can be movably disposed. According to the method at least one value of the first sensor may be acquired. According to the method at least one value of the second sensor may be acquired. According to the method a status of the rotor locking system may be determined by means of the operation control unit based on the at least one value of the first sensor and the at least one value of the second sensor. According to the method the determined status of the rotor locking system may be output by means of a signaling device and/or a communication device.

According to another aspect the recess of the rotor locking disk and the rotor locking pin can have corresponding conical shapes. The taper angle of the recess and the rotor locking pin can advantageously be equal to or larger than 2° and equal to or smaller than 25°. The taper angle can further advantageously be given by approximately 11.9°.

According to another aspect, the rotor locking system can be configured to be hand-operated. The rotor locking system can further be configured to be hand-operated in case of a power loss of secondary devices, such as valves and sensors. The valves and sensors can be configured to indicate their statuses using mechanical indicators. This advantageously allows the rotor locking system to be operated even in case of a power loss.

According to another aspect, the rotor locking system may be configured to have an expected/calculated service lifetime of approximately twenty-five years.

Embodiments of the present invention also provide a wind driven power plant comprising the rotor lock according to the aspects and embodiments of the invention.

Embodiments of the present invention also provide a wind park comprising a plurality of wind driven power plants comprising the rotor lock according to the aspects and embodiments of the invention.

BRIEF DESCRIPTION

Some of the embodiments will be described in detail, with reference to the following figures, wherein like designations denote like members, wherein.

DETAILED DESCRIPTION

Figure 1:
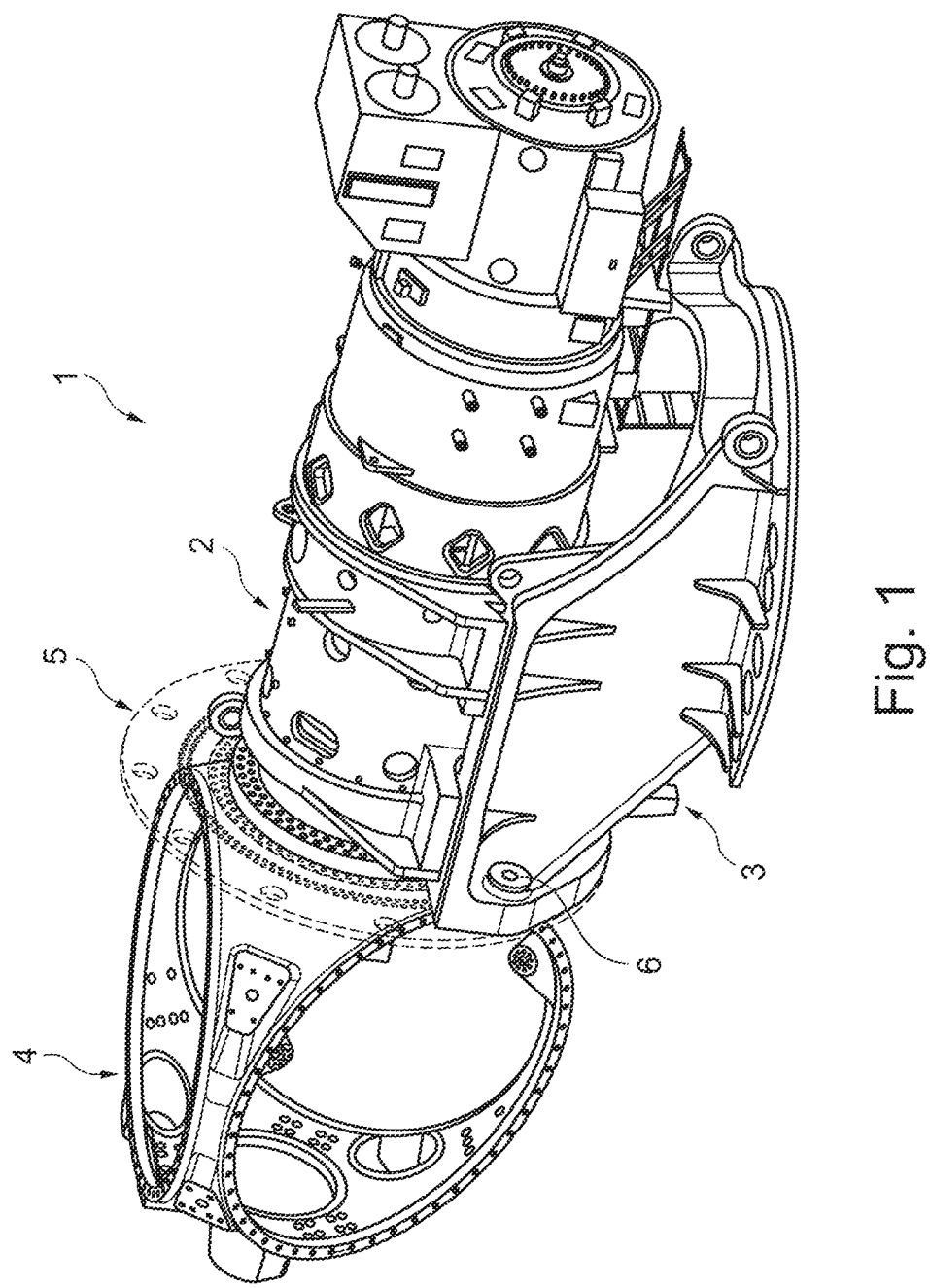
FIG. 1 is a simplified perspective view of the drive train of a wind driven power plant.

FIG. 1 is a simplified perspective view of the drive train 1 of a wind driven power plant. The drive train 1 comprises a main shaft, a main shaft housing 2 and a main frame 3. The drive train 1 is mounted by means of the main frame 3 to a tower of the wind driven power plant. The drive train 1 further comprises a rotor hub 4 at the front end which is mounted to the main shaft. The rotor hub 4 is a cast part which is configured such that the rotor blade roots can be mounted at the cast part in order to fix the blades at the rotor hub.

The rotor locking system comprises the rotor locking disk 5. The rotor locking disk 5 is rigidly mounted to the rotor hub 4 by means of a screwed connection. More precisely, the rotor locking disk 5 is mounted to an end face of the rotor hub 4 which is directed towards the main shaft of the drive train 1. This means, that the rotor locking disk 5 is arranged between the rotor hub 4 and the main shaft housing 2. Due to the rigid connection, the rotor locking disk 5 and the rotor hub 4 uniformly rotate with respect to each other.

The rotor locking system further comprises a rotor locking pin unit 6. The rotor locking pin unit 6 is mounted to the main frame 3 facing towards the rotor locking disk 5. The longitudinal axis of the rotor locking pin unit 6 is in parallel to the longitudinal axis of the main shaft. The longitudinal axis of the rotor locking pin unit further is perpendicularly aligned with respect to the end face of the rotor locking disk 5. The rotor locking pin unit 6 is positioned laterally aside the main shaft housing 2. The rotor locking pin unit 6 is positioned slightly below the longitudinal axis of the main shaft and the rotor hub 4. The supply connections of the rotor locking pin unit 6 are arranged at the back of the rotor locking pin unit 6 facing away from the rotor locking disk 5. For the present embodiment, the rotor locking system further comprises a second rotor locking pin unit 6. The second rotor locking pin unit 6 is positioned on the opposite side of the drive train 1 in the same height with respect to the drive train 1. Both rotor locking pin units 6, 6' are mirror symmetrically aligned with respect to the drive train 1.

Figure 2:
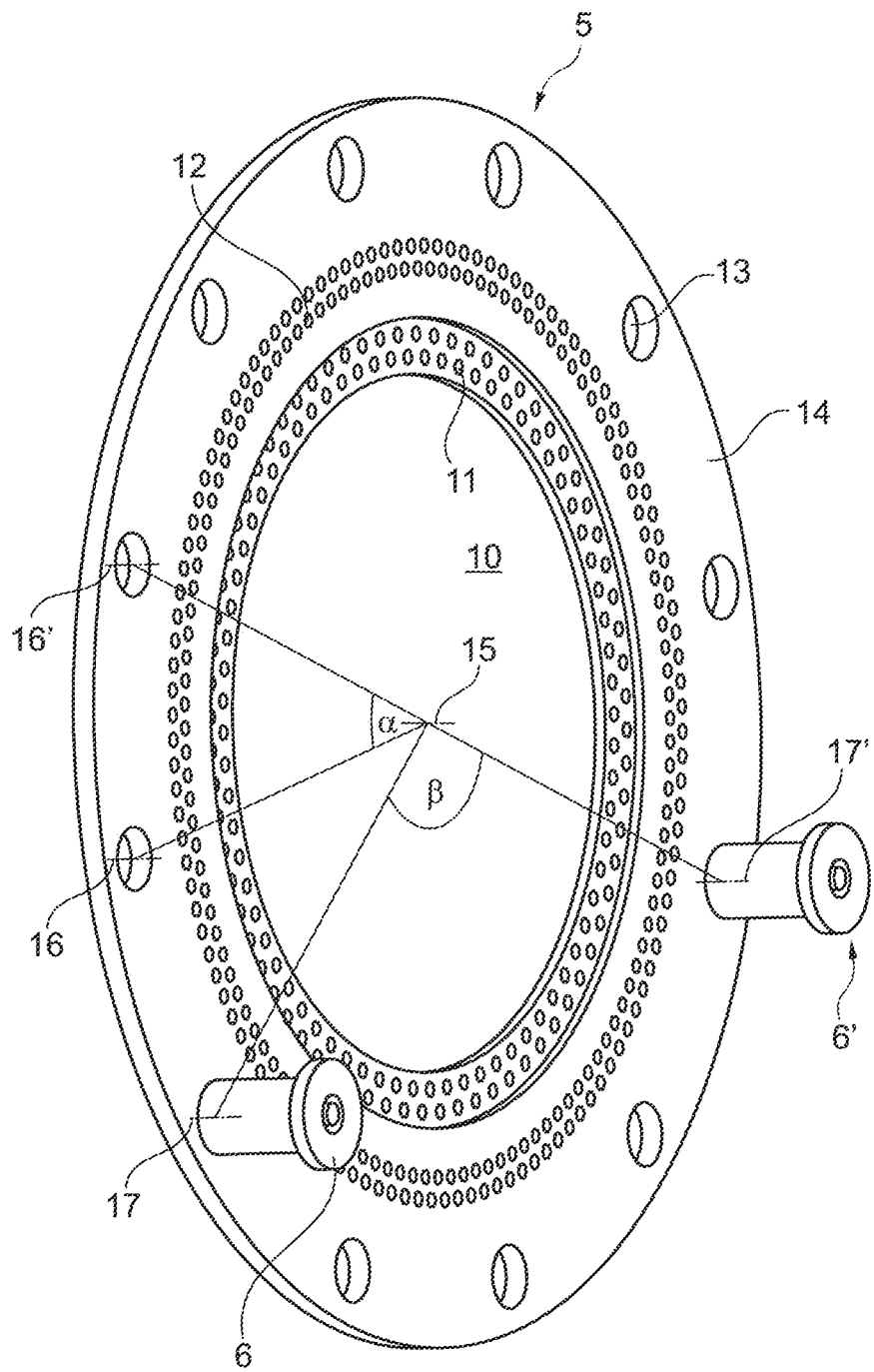
FIG. 2 is a simplified perspective view of two rotor locking pin units with rotor locking pins in the second position and the rotor locking disk.

FIG. 2 is a simplified perspective view of two rotor locking pin units 6, 6' with rotor locking pins in the second position and the rotor locking disk 5.

The rotor locking disk 5 is a massive metallic disk with a central bore. The central bore 10 is configured to guide service lines towards the rotor blade roots and their pitch actuators inside the interior space of the rotor hub 4. For the present embodiment the rotor locking disk 5 has a maximum thickness of 100 mm.

The rotor locking disk 5 further comprises several sets of through holes 11, 12 and another set of recesses 13. The sets of through holes 11, 12 are positioned at an inner portion of the rotor locking disk 5 relatively close to the central bore 10 of the rotor locking disk 5. The first set of through holes 11 is used to mount the rotor locking disk 5 and the rotor hub 4 to the main shaft by means of a screwed connection. The second set of through holes 12 may be used to mount additional parts to the rotor locking disk 5. The set of recesses 13 is positioned at an outer portion of the rotor locking disk 5. The radius of the recess circle is larger than the radii of the hole circles of the sets of through holes.

The recesses 13 have a conical shape. Their diameter on the end face 14 of the rotor locking disk 5 facing towards the main shaft housing 2 is larger than their diameter on the end face of the rotor locking disk 5 facing towards the rotor hub 4. The diameter of the recess on the end face 14 of the rotor locking disk 5 facing towards the main shaft housing 2 is 280 mm. The diameter of the recess on the opposing end surface of the rotor locking disk 5 is 238 mm.

The set of recesses 13 comprises twelve recesses 13 in total which are symmetrically arranged with respect to the longitudinal axis of the rotor locking disk 5. The connecting lines of the longitudinal axis 15 of the rotor locking disk 5 towards the longitudinal axes 16, 16' of neighboring recesses 13 enclose an angle $\alpha$. For the present embodiment the angle $\alpha$ is 30°.

FIG. 2 also illustrates the alignment of the rotor locking pin units 6, 6' with respect to the recesses 13 of the rotor locking disk 5. The rotor locking pin units 6, 6' are positioned such that their longitudinal axes 17, 17' are perpendicularly aligned with respect to the end face 14 of the rotor locking disk 5. Their longitudinal axes 17, 17' also coincide with the recess circle of the recesses 13 of the rotor locking disk 5. The connecting lines of the longitudinal axis 15 of the rotor locking disk 5 towards the longitudinal axes 17, 17' of the rotor locking pin units 6, 6' enclose an angle $\beta$. The angle $\beta$ advantageously is an integer multiple of the angle $\alpha$. For the present embodiment the angle $\beta$ is 120°. This means that the rotor locking disk 5 can be arranged such that both rotor locking pins are simultaneously aligned with one recess 13 each of the rotor locking disk 5.

Figure 3:
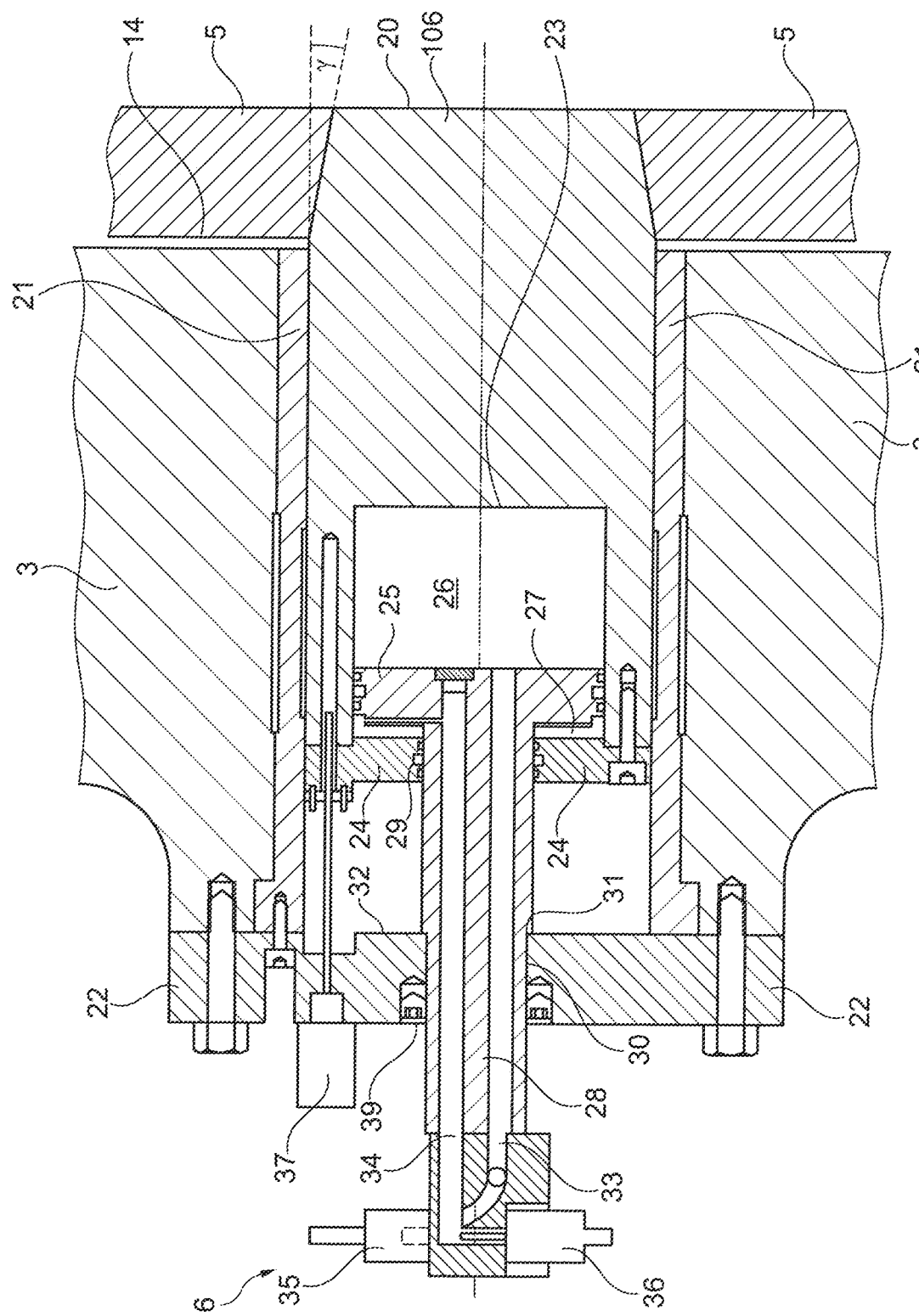
FIG. 3 is a simplified schematic drawing of a rotor locking pin unit with a rotor locking pin in the second position extending into a recess of the rotor locking disk.

FIG. 3 is a simplified schematic view of a rotor locking pin unit 6 with a rotor locking pin 106 in the second position extending into a recess 13 of the rotor locking disk 5. In the right region of the figure, there is the rotor locking disk 5. The recess 13 of the rotor locking disk 5 has a conical shape.

In the middle region of the image there is a rotor locking pin 106. The front face 20 of the rotor locking pin 106 is oriented towards the rotor locking disk 5. The front end of the rotor locking pin 106 has a conical shape which is corresponding to the conical shape of the recess 13 of the rotor locking disk 5. The taper angle $\gamma$ is given by approximately 11.9°. In the second position, the rotor locking pin 106 is extending into the recess 13 of the rotor locking disk 5. The rotor locking pin 106 has a maximum outer diameter of 280 mm. The rotor locking pin 106 has a minimum outer diameter of 238 mm. The rotor locking pin has a total length of 525 mm.

There is a bushing 21 of the rotor locking pin unit 6 which provides support and guidance for the rotor locking pin 106. The bushing 21 has a cylindrical shape. The rotor locking pin 106 is movable inside the interior space of the bushing 21. The bushing 21 of the rotor locking pin unit 6 has an outer diameter of 330 mm and an inner diameter of 280 mm.

If the rotor locking pin 106 is retracted, the front face 20 of the rotor locking pin 106 is outside the recess 13 of the rotor locking disk 5. In the fully retracted position there is a gap between the front face 20 of the rotor locking pin 106 and the end surface 14 of the rotor locking disk 5 which is oriented towards the main shaft housing 2, i.e. towards the rotor locking pin 106. For the present embodiment the gap is 10 mm wide.

The bushing 21 of the rotor locking pin unit 6 is mounted by means of a screwed connection to a rotor lock fixation flange 22 and/or a tight fit to the main frame.

The rotor locking pin 106 comprises a cylindrical recess 23 and a cap 24. The cap 24 is mounted to the rotor locking pin 106 by a screwed connection. The cylindrical recess 23 is closed by the cap 24 so that a working space is defined. The rotor locking pin 106 further comprises a piston 25. The piston 25 is configured to act as a double acting piston 25. The piston 25 divides the working space into two working volumes 26, 27. The outer diameter of the piston 25 substantially corresponds to the clear diameter of the cylindrical recess 23. The piston 25 further comprises a multiple sealing to close the remaining slit between the side face of the piston 25 and the inner walls of the cylindrical recess 23.

The relative sizes of both working volumes 26, 27 determine the position of the rotor locking pin 106. Under the theoretical assumption of an incompressible and cavitation-free process fluid and furthermore a substantially friction-free movement of the rotor locking pin 106 inside the bushing 21 as well as a substantially friction-free movement of the piston 25 inside the rotor locking pin 106, a variation of the size of the working volumes 26, 27 relates to variations of the internal pressures inside the working volumes 26, 27. If the pressure in working volume 26 is smaller than the pressure in working volume 27, the rotor locking pin 106 retracts until it is fully retracted (first position). If the pressure in working volume 26 is larger than the pressure in working volume 27, the rotor locking pin 106 extends until it is fully extended (second position) or it abuts an obstacle, e.g. the rotor locking disk 5 if the rotor locking pin 106 is not aligned with a recess 13 of the rotor locking disk 5. This means that the rotor locking pin 106 acts as a locking cylinder driven by the relative pressures inside the working volumes 26, 27 which are determined by the piston 25. Note, that a difference of the pressure-loaded areas of the piston 25 on which the pressures of both reservoirs 26, 27 act, is neglected in the scope of this discussion.

The piston 25 further comprises a plunger rod 28. The plunger rod 28 is encompassed through a central bore 29 of the cap 24 of the rotor locking pin 106. The remaining slit between the inner surface of the central bore 29 of the cap 24 and the outer surface of the plunger rod 28 is closed by a multiple sealing.

The plunger rod 28 is further encompassed through a central bore 30 of the rotor lock fixation flange 22 to the back of the rotor locking pin unit 6. The plunger rod 28 further comprises a shaft shoulder 31. The shaft shoulder 31 abuts the inner surface 32 of the rotor lock fixation flange 22. There is also a clamping ring 39 attached from the outside to a ring-shaped recess of the rotor lock fixation flange 22. By means of the shaft shoulder 31 and the clamping ring 39 the plunger rod 28 is fixed in position. Contrary to common pneumatic or hydraulic actuator elements the piston 25 is fixed in position while the rotor locking pin 106 acts as a moving cylinder. In another embodiment the axial fixation of the plunger rod 28 with regard to the rotor lock fixation flange 22 could be achieved with an additional ring flange that is fixed with screws.

The plunger rod 28 further comprises two supply lines 33, 34. Each one of these supply lines 33, 34 is connected to one working volume 26, 27 of the rotor locking pin 106. At the back of the plunger rod 28 connections 35, 36 for each supply line 33, 34 are applied. The supply lines 33, 34 may also be an integral part of the rotor locking pin unit and/or may further be integrated into a central pipe which comprises the supply connections of the rotor locking pin unit 6.

The rotor lock fixation flange 22 is mounted by means of an additional screwed connection to the main frame 3 of the drive train 1. Thereby the entire rotor locking pin unit 6 is mounted to the main frame 3. The rotor lock fixation flange 22 and/or the central pipe may be part of a housing part of the rotor locking pin unit 6.

The rotor lock fixation flange 22 and the cap 24 of the rotor locking pin 106 both comprise an additional through hole. The rotor locking pin 106 further comprises another blind hole. The additional through holes and the blind hole are aligned to each other. They provide guidance for a displacement sensor 37 which is mounted to the rotor lock fixation flange 22. The displacement sensor 37 is configured to detect the position of the rotor locking pin 106 across the entire possible travel way. The displacement sensor 37 is further configured to output the detected position as a signal. In particular, the displacement sensor 37 is configured to output the detected position as an analog signal.

The conical shapes of the rotor locking pin 106 and the rotor locking disk 5 enable a self-aligning mechanism to be carried out. Once the rotor locking pin 106 impinges the recess 13 of the rotor locking disk 5, misalignments of the recess 13 of the rotor locking disk 5 with respect to the rotor locking pin 106 can be compensated by further pushing the rotor locking pin 106 into the recess 13 of the rotor locking disk 5. This will lead to a rotation of the rotor locking disk 5 until the recess 13 and the rotor locking pin 106 are perfectly aligned with respect to each other.

Figure 4:
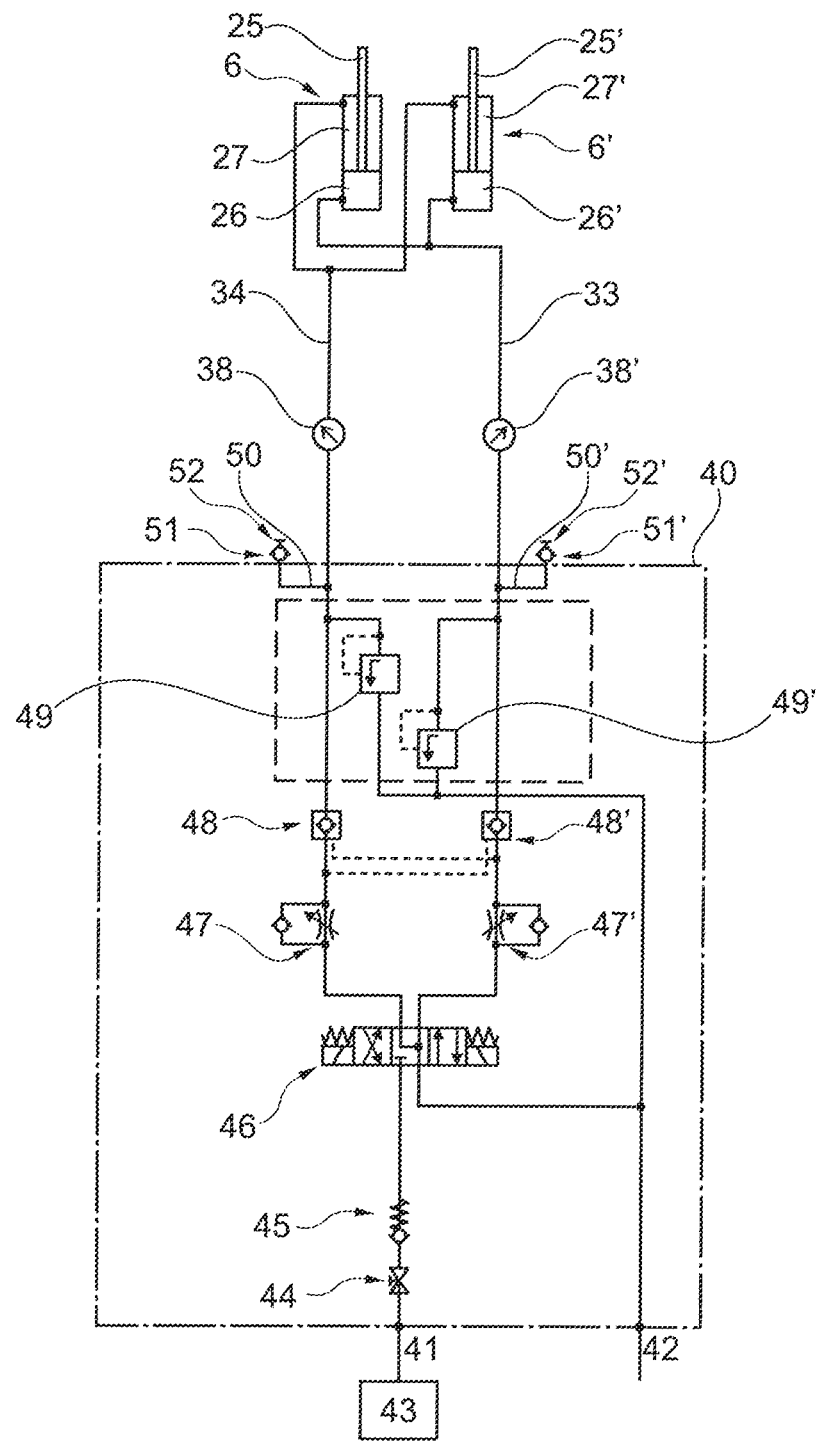
FIG. 4 is a simplified schematic drawing of the circuit of the process fluid of the rotor locking system.

FIG. 4 is a simplified schematic drawing of the circuit of the process fluid of the rotor locking system. The circuit comprises a valve block 40 of the rotor locking system. The external connections and devices attached to the valve block 40 will be explained first, followed by a detailed description of the valve block 40 beginning at the side of the high pressure unit 43 which provides the pressure of the process fluid.

The valve block 40 comprises an input 41 and output 42. The input 41 is connected to a high pressure unit 43 (HPU) configured to provide high pressures of the process fluid. Advantageously, the HPU 43 can provide pressures of equal to or more than 30 bar and equal to or less than 350 bar. Further advantageously, the HPU 43 can provide pressures of equal to or more than 200 bar and equal to or less than 220 bar. The output 42 is connected to a tank which is a reservoir for the HPU 43. The HPU can also include a hand pump that is configured to provide the pressure for the process fluid in case the wind turbine is not connected to energy supply.

The circuit further comprises two supply lines 33, 34 which are connected to the double acting pistons 25, 25' of the rotor locking pins units 6, 6'. The supply line 33 is connected to those working volumes 26, 26' in parallel which cause the rotor locking pins 106, 106' to extend if the pressure inside these working volumes 26, 26' is larger than inside the corresponding working volumes 27, 27'. The supply line 34 is connected to the corresponding working volumes 27, 27' in parallel. Note, that differences of the pressure-loaded areas of the pistons 25, 25' on which the pressures of both reservoirs 26, 26', 27, 27' act, are neglected in the scope of this discussion.

A manual valve 44 is connected to the input 41 followed by a spring-loaded check valve 45. There is a 4-port/3-way directional control valve 46 which has a swimming neutral position. This valve 46 is electromagnetically controlled. The first port of the 4-port/3-way directional control valve 46 is connected to the input 41 of the valve block 40, the second port is connected to the output 42 of the valve block 40, the third port is connected to the supply line 33 and the fourth port is connected to the supply line 34. In the neutral position the valve 46 connects the supply lines 33 and 34 to the second port, i.e. the output 42 of the valve block 40. In the remaining positions of the 4-port/3-way directional control valve 46 the first port, i.e. the input 41 of the valve block 40, can either be connected to the supply line 33 or the supply line 34, whereas for each position the second port, i.e. the output 42 of the valve block 40 is connected to the corresponding supply line 34, 33.

Behind the 4-port/3-way directional control valve 46 for each of those lines 33, 34 a throttle-check valve 47, 47' is applied. The flow rates of the back-flow direction of both lines 33, 34 are not substantially limited. The throttle-check valve 47' of the supply line 33 is configured to apply a higher inflow rate than the remaining throttle-check valve 47. This means that the moving speeds of the rotor locking pins 106, 106' while extending and retracting are different from each other. In particular, the moving speed while extending the rotor locking pins 106, 106' is advantageously greater than the moving speed while retracting the rotor locking pins 106, 106'.

The throttle-check valves 47, 47' are followed by a pilot operated dual acting counterbalance valve 48, 48'. The control mechanism of the valve 48' of the supply line 33 is given by the pressure in the supply line 34 after the throttle valve 47. The control mechanism of the valve 48 of the supply line 34 is given by the pressure in the supply line 33 after the throttle valve 47'. If a significant pressure is applied to the supply line 34 behind the throttle valve 47, the valve 48' of the supply line 33 opens and a process fluid can flow along the back-flow direction through the valve 48'.

In other words, the counterbalance valve 48, 48' is configured leak-free holding a load. The valve 48 remains closed until the input pressure (the pressure in the supply line after the throttle valve 47 and 47') is larger than a specified value. This means that the position of the rotor locking pins 106, 106' is fixed, i.e. locked, as long as the input pressure of the valve 48 is lower than the specified pre-load.

There are further pressure relief valves 49, 49' applied to the supply lines 33 and 34, respectively. The outputs of the valves 49, 49' are connected to the recovery line, i.e. the output 42 of the valve block 40. The pressure relief valves 49, 49' are pre-loaded devices, which means that they are configured as an overpressure prevention.

The supply lines 33, 34 further comprise each one side line 50, 50'. The side lines 50, 50' comprise further check valves 51, 51' and downstream manual valves 52, 52' which are configured to relieve the process fluid from the circuit.

The supply lines further comprise a first and a second pressure sensor 38, 38'. The pressure sensors 38, 38' are configured to detect the pressures inside the working volumes 26, 26', 27, 27'. The pressure sensors 38, 38' are further configured to output the detected pressures as analog signals. By positioning the pressure sensors 38, 38' behind the pilot-operated dual acting counterbalance valve 48, it is guaranteed, that the pressure sensors 38, 38' are directly connected to the reservoirs of the working volumes 26, 26', 27, 27' inside both rotor locking pins 106, 106'.

The supply lines 33, 34 are then connected to the working volumes 26, 26', 27, 27' of the double acting rotor locking pins 106, 106' in parallel. The circuit of the process fluid is advantageously configured such that the rotor locking pins 106, 106' simultaneously act similar to each other. Further, due to the pressure relief valve 49 the circuit is advantageously configured to protect the circuit against hydraulic line failures and pressure shocks caused by external forces or overrunning loads. The circuit further provides a cavitation-free motion control to match the speed to the flow rate when a load could cause a loss of control of an actuator element, e.g. by the pistons 25, 25'. The counterbalance valve 48 also provides a smooth and modulated motion control when the valve 46 is suddenly closed.

Figure 5:
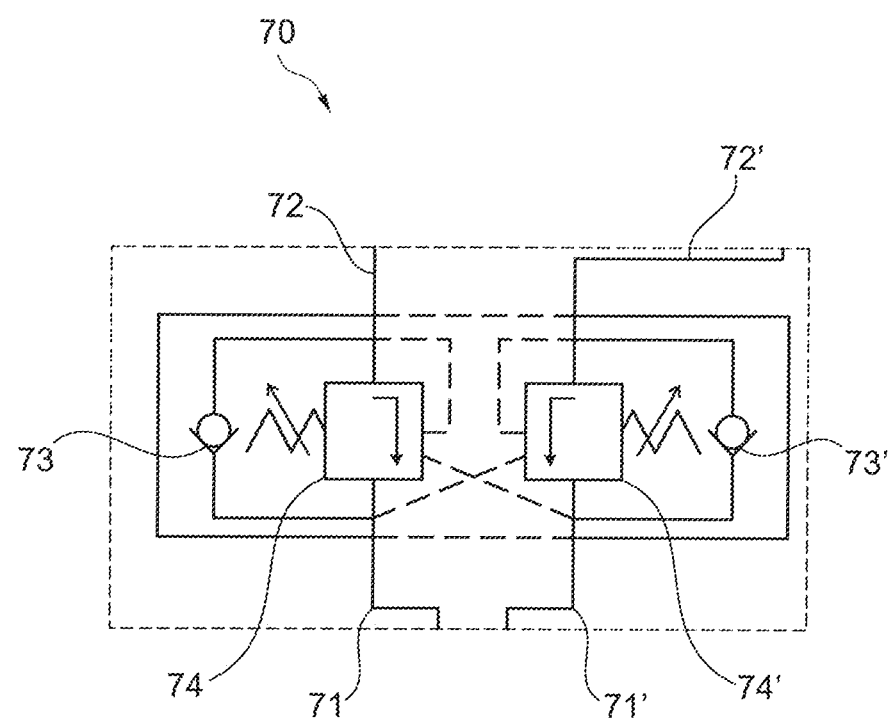
FIG. 5 is a simplified schematic drawing of a part of the circuit of the process fluid of the rotor locking system.

FIG. 5 is a simplified schematic drawing of a part of the circuit of the process fluid of the rotor locking system.

There is a different embodiment of the pilot-operated dual acting counterbalance valve 70. The counterbalance valve 70 is configured to replace the counterbalance valves 48, 48' of the previous embodiment. Lines 71, 71' are the input lines, coming from the side of the high-pressure unit 43. Lines 72, 72' are directed towards the rotor locking pin units 6, 6'. Each side of the pilot-operated dual acting counter balance valve 70 comprises a check valve 73, 73' such that the back-flow direction generally is closed. Contrary, the check valves 73, 73' allow process fluid to pass in the forward flow direction. The pilot-operated pressure relief valves 74, 74' are preloaded and generally closed.

Valve 74 opens if the pressure inside the supply line 71' overcomes a first preload of valve 74. Valve 74 also opens if the pressure in the line 72 overcomes a second preload of valve 74. The status of valve 74' is accordingly determined by the corresponding pressures inside the lines 71' and/or 72'.

With this configuration, the circuit advantageously ensures that the amount of process fluid inside the working volumes, and thereby the size of the working volumes, can only be changed in dependence on each other. This means, that an increase of the working volumes 26, 26' is only possible if the working volumes 27, 27' are decreased simultaneously.

Optionally, the pilot-operated dual acting counterbalance valve 70 can also be configured to serve for the functionality of the pressure relief valves 49, 49'.

Figure 6:
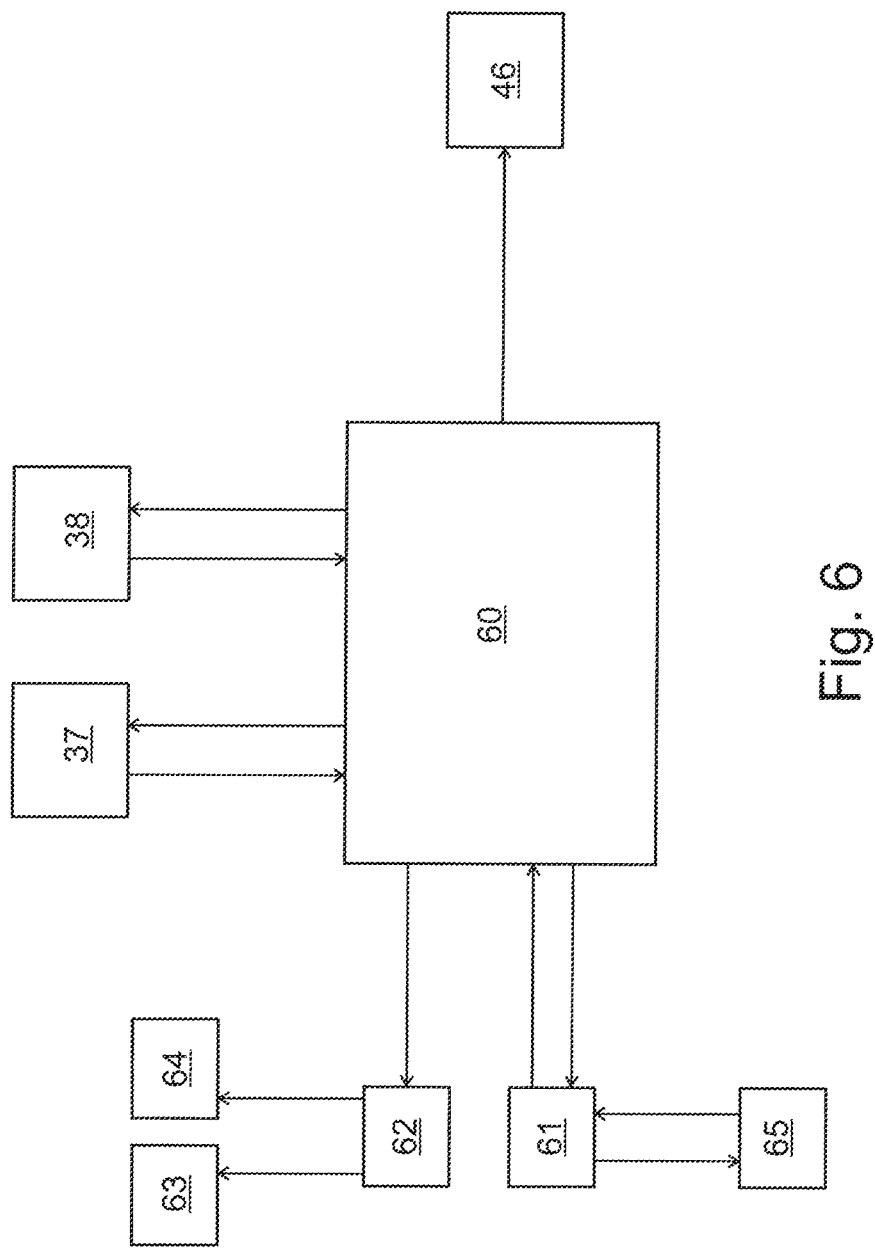
FIG. 6 is a simplified schematic drawing of the circuit of the operation control unit.

FIG. 6 is a simplified schematic drawing of the circuit of the operation control unit.

The operation control unit 60 of the rotor locking system is configured to detect several statuses of the rotor locking system. The displacement sensor 37 and the pressure sensor 38 are connected to the operation control unit 60. The displacement sensor 37 and the pressure sensor 38 convert the detected position of the rotor locking pin 106 and the detected pressures inside the working volumes 26, 27 into signals. These signals are provided to the operation control unit 60. The operation control unit 60 is configured to interpret the signals in order to identify different statuses of the rotor locking system. The identification of the statuses bases on several pre-specified values of the position of the rotor locking pin 106 and the pressures inside the working volumes 26, 27 indicating different configurations of the rotor locking system.

TABLE 1

Statuses of the rotor locking system which can be identified by the operation control unit.

| Status | Displacement sensor | Pressure sensor |
|---|---|---|
| Rotor locked | >min. position lock | >min. lock pressure |
| Rotor unlocked | <max. position unlock | >min. unlock pressure |
| Fault misalign. A | Extend: <min. position lock | >min. lock pressure |
| Fault misalign. B | Retract: >max. position unlock | >min. unlock pressure |
| Alarm (locked status) | — | <min. lock pressure |
| Alarm (locked status) | <min. position lock | — |
| Alarm (unlocked status) | >min. position unlock | — |

Tab. 1 gives an overview of the statuses of the rotor locking system which can be identified by the operation control unit 60.

The first status refers to a locked rotor. This status is determined if the displacement sensor 37 detects a position of the rotor locking pin 106 which is larger than a pre-specified minimum locking position of the rotor locking pin 106 and the pressure sensor 38 detects a pressure that is larger than a minimum pre-specified locking pressure of the working volume 26. This status corresponds to a fully extended rotor locking pin 106 which means that the rotor is locked.

The second status refers to an unlocked rotor. This status is determined if the displacement sensor 37 detects a position of the rotor locking pin 106 which is smaller than a pre-specified maximum unlocking position of the rotor locking pin 106 and the pressure sensor 38 detects a pressure that is larger than a minimum pre-specified unlocking pressure of the working volume 27. This status corresponds to a fully retracted rotor locking pin 106 which means that the rotor is unlocked.

The third status refers to a fault misalignment type A. This status is determined if the displacement sensor 37 detects a position of the rotor locking pin 106 which is smaller than a pre-specified minimum locking position of the rotor locking pin 106 and the pressure sensor 38 detects a pressure that is larger than a minimum pre-specified locking pressure of the working volume 26. This status corresponds to an uncomplete extending of the rotor locking pin 106 towards the fully extended configuration.

The fourth status refers to a fault misalignment type B. This status is determined if the displacement sensor 37 detects a position of the rotor locking pin 106 which is larger than a pre-specified maximum unlocking position of the rotor locking pin 106 and the pressure sensor 38 detects a pressure that is larger than a minimum pre-specified unlocking pressure of the working volume 27. This status corresponds to an uncomplete retracting of the rotor locking pin 106 towards the fully retracted configuration.

The fifth and the sixth status refer to an alarm during the locked status which implies hazards for equipment and persons as long as this status occurs. These statuses are determined if the displacement sensor 37 detects a position of the rotor locking pin 106 which is smaller than a pre-specified minimum locking position of the rotor locking pin 106 and/or the pressure sensor 38 detects a pressure that is smaller than a minimum pre-specified locking pressure of the working volume 26. These statuses correspond to an intermediate status in which the rotor locking pin 106 is potentially in an intermediate position and/or the pressure is potentially insufficient to keep the rotor locking pin 106 in the extended position. These statuses reflect a configuration in which serious hazards may occur for equipment and persons due to a potential movement of the rotor locking disk 5 and/or a potential spontaneous impact of the rotor locking pin 106 on the rotor locking disk 5.

The seventh status refers to an alarm during the unlocked status which implies hazards for equipment and persons as long as this status occurs. This status is determined if the displacement sensor 37 detects a position of the rotor locking pin 106 which is larger than a pre-specified maximum unlocking position of the rotor locking pin 106.

The operation control unit 60 is further configured to manipulate the status of devices or sensors 37, 38 being connected to the operation control unit 60. This way, the operation control unit may for instance vary the sampling rate of connected sensors 37, 38.

The operation control unit 60 is further configured to manipulate the statuses of the circuit of the process fluid in order to select another status of the rotor locking system. The operation control unit 60 comprises an output which is connected to the 4-port/3-way directional control valve 46 of the circuit of the process fluid. Thereby the pressures of the process fluid inside the working volumes 26, 27 of the rotor locking pin 106 can be readjusted in order to change the status of the rotor locking system. After the output signal is applied, changes of the system in terms of a movement of the rotor locking pin 106 may again be detected by the connected sensors.

The operation control unit 60 is further configured to output the determined status of the rotor locking system by means of a communication device 61 and/or a signaling device 62.

The communication device 61 is configured to communicate by means of a wired or wireless connection with a remote control 65. The communication device 61 and the operation control unit 60 are further configured to transmit several data or data sets of devices or sensors 37, 38 being connected to the operation control unit 60 towards the remote control. The communication device 61 and the operation control unit 60 are further configured such that the remote control 65 can access the operation control unit 60 and execute commands in order to alter the status of the rotor locking system or of devices or sensors being connected to the operation control unit 60.

The signaling device 62 is configured to indicate the status of the rotor locking system by means of an acoustic or optic signal, e.g. by a display 63 or a horn 64.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A rotor locking system for a rotor hub of a wind driven power plant, comprising a rotor locking disk, a rotor locking pin unit, and a rotor locking pin, wherein the rotor locking disk is mounted to the rotor hub, wherein the rotor locking pin is an actuated element of the rotor locking pin unit, wherein the rotor locking pin is configured to assume a first position, wherein the rotor locking pin is configured to assume a second position in which the rotor locking pin extends into a recess of the rotor locking disk such that a rotation of the rotor hub is preventable, and wherein the rotor locking pin is lockable, wherein the rotor locking system comprises a displacement sensor, a first pressure sensor, and an operation control unit, and wherein a locked position of the rotor locking pin, an unlocked position of the rotor locking pin, a misalignment position of the rotor locking pin, and an intermediate position of the rotor locking pin are detectable by the displacement sensor, the first pressure sensor, and the operation control unit.

2. The rotor locking system according to claim 1, wherein the rotor locking system further comprises a locking sensor, and wherein the locking sensor is configured to determine a locking status of the rotor locking pin.

3. The rotor locking system according to claim 1, wherein the rotor locking pin is a hydraulically driven cylinder.

4. The rotor locking system according to claim 1, wherein the rotor locking system further comprises a working space and a piston, wherein the piston defines a first working volume inside the working space, and wherein a position of the piston inside the working space defines a position of the rotor locking pin.

5. The rotor locking system according to claim 4, wherein an internal pressure inside the first working volume is detectable by the first pressure sensor.

6. The rotor locking system according to claim 5, wherein the rotor locking system further comprises at least one of (a) a valve for the first working volume inside the working space, and wherein the valve is configured as a load holding valve, and (b) a second working volume and a counterbalance valve, wherein the counterbalance valve is connected to the first working volume and the second working volume, and wherein an unlocking of the rotor locking pin is preventable by means of the counterbalance valve, wherein at least one out of the load holding valve and the counterbalance valve and the first pressure sensor and a second pressure sensor is directly connected to at least one of a central pipe and a housing part of the rotor locking pin unit, wherein at least one of the central pipe and the housing part of the rotor locking pin unit comprises supply lines, and wherein the supply lines are connected to at least one of the first working volume and the second working volume, and are an integral part of the rotor locking pin unit.

7. The rotor locking system according to claim 4, wherein the rotor locking system further comprises a valve for the first working volume inside the working space, and wherein the valve is configured as a load holding valve.

8. The rotor locking system according to claim 4, wherein the rotor locking system further comprises a second working volume and a counterbalance valve, wherein the counterbalance valve is connected to the first working volume and the second working volume, and wherein an unlocking of the rotor locking pin is preventable by means of the counterbalance valve.

9. The rotor locking system according to claim 8, wherein the rotor locking system further comprises a second pressure sensor, wherein an internal pressure inside the second working volume is detectable by the second pressure sensor.

10. The rotor locking system according to claim 1, wherein the operation control unit is configured to determine a status of the rotor locking system by means of at least one value of the displacement sensor and at least one value of the first pressure sensor, and wherein the operation control unit is configured to output the determined status by at least one of a signaling device and a communication device.

11. The rotor locking system according to claim 1, wherein the rotor locking pin unit is supported by a main frame of the wind driven power plant.

12. The rotor locking system according to claim 1, wherein the rotor locking system further comprises an interface for remote control and wherein the rotor locking pin is remotely controllable.

13. The rotor locking system according to claim 1, wherein the rotor locking system further comprises a plurality of rotor locking pins.

14. A wind driven power plant comprising a rotor locking system according to claim 1.

15. A wind park comprising a plurality of wind driven power plants according to claim 14.

16. A method for determining a status of a rotor locking system comprising a rotor locking disk and a rotor locking pin which is movably disposed, an operation control unit, a first sensor, and a second sensor, wherein the first sensor is a displacement sensor, wherein the second sensor is a pressure sensor,
- wherein a locked position of the rotor locking pin, an unlocked position of the rotor locking pin, a misalignment position of the rotor locking pin, and an intermediate position of the rotor locking pin are detectable by the displacement sensor, the pressure sensor, and the operation control unit,
- wherein an internal pressure inside a first working volume is detectable by the pressure sensor,
- wherein the rotor locking system further comprises a working space and a piston, wherein the piston defines the first working volume inside the working space, and wherein a position of the piston inside the working space defines a position of the rotor locking pin, wherein the method comprises:
- acquiring at least one rotor locking pin position value of the displacement sensor,
- acquiring at least one first working volume value of the pressure sensor,
- determining the status of the rotor locking system by means of the operation control unit based on the at least one acquired value of the displacement sensor and the at least one acquired value of the pressure sensor,
- outputting the determined status of the rotor locking system by at least one of a signaling device and a communication device.

\* \* \* \* \*